United States Patent
Chiu

(10) Patent No.: US 7,863,872 B2
(45) Date of Patent: Jan. 4, 2011

(54) BUCK-BOOST SWITCHING REGULATOR AND CONTROL METHOD THEREOF

(75) Inventor: Wei-Che Chiu, Hsinchu (TW)

(73) Assignee: Richtek Technology Corporation, Hsin Chu (TW)

(*) Notice: Subject to any disclaimer, the term of this patent is extended or adjusted under 35 U.S.C. 154(b) by 296 days.

(21) Appl. No.: 12/229,199

(22) Filed: Aug. 20, 2008

(65) Prior Publication Data
US 2009/0295343 A1     Dec. 3, 2009

(30) Foreign Application Priority Data
Jun. 3, 2008     (TW) .............................. 97120588 A

(51) Int. Cl.
*G05F 1/24* (2006.01)
(52) U.S. Cl. ...................... 323/271; 323/282
(58) Field of Classification Search ................ 323/259, 323/271, 282, 284, 344, 351
See application file for complete search history.

(56) References Cited
U.S. PATENT DOCUMENTS
6,166,527 A * 12/2000 Dwelley et al. ............. 323/222
7,336,056 B1 * 2/2008 Dening et al. ............... 323/222
7,570,033 B1 * 8/2009 Ju .............................. 323/259

* cited by examiner

*Primary Examiner*—Adolf Berhane
*Assistant Examiner*—Emily Pham
(74) *Attorney, Agent, or Firm*—Tung & Associates

(57) ABSTRACT

The present invention discloses a buck-boost switching regulator, comprising: (1) a first loop including: a first and a second switch electrically connected with each other, the first switch having an end electrically connected with an input voltage, and the second switch having an end electrically connected with ground; and a first control circuit controlling the operation of the first and the second switch; (2) a second loop including: a third and a fourth switch electrically connected with each other, the third switch having an end electrically connected with ground, and the fourth switch having an end electrically connected with an output voltage; and a second control circuit controlling the operation of the third and the fourth switch; and (3) an inductor electrically connected between a node between the first and the second switch, and a node between the third and the fourth switch.

4 Claims, 2 Drawing Sheets

BUCK-BOOST SWITCHING REGULATOR AND CONTROL METHOD THEREOF

BACKGROUND OF THE INVENTION

1. Field of the Invention

The present invention relates to a buck-boost switching regulator, in particular to one with high efficiency, and a method thereof.

2. Description of the Related Art

FIG. 1 shows a conventional buck-boost switching regulator 1, which includes four transistor switches SW1-SW4, controlled by a control circuit 14. The circuit 1 compares a feedback voltage FB obtained from the output terminal with a reference voltage Vref in an error amplifier 12. The control circuit (Ctl. Ckt.) 14 controls the switches SW1-SW4 according to the comparison.

The drawbacks in the prior art are thus. The four switches SW1-SW4 are controlled by the same circuit in the same loop, and they all operate in one given period. Hence the switching loss is high and the efficiency is low. In addition, the overall bandwidth of the switching regulator is limited by the boost mode operation.

In view of the foregoing drawbacks, the present invention proposes a buck-boost switching regulator with high efficiency, and a method for controlling the switching regulator.

SUMMARY OF THE INVENTION

A first objective of the present invention is to provide a buck-boost switching regulator with high efficiency.

A second objective of the present invention is to provide a control method for controlling a buck-boost switching regulator.

To achieve the foregoing objectives, according to an aspect of the present invention, a buck-boost switching regulator comprises:

(1) a first loop including: a first and a second switch electrically connected with each other, the first switch having an end electrically connected with an input voltage, and the second switch having an end electrically connected with ground; and a first control circuit controlling the operation of the first and the second switch;

(2) a second loop including: a third and a fourth switch electrically connected with each other, the third switch having an end electrically connected with ground, and the fourth switch having an end electrically connected with an output voltage; and a second control circuit controlling the operation of the third and the fourth switch; and (3) an inductor electrically connected between a node between the first and the second switch, and a node between the third and the fourth switch.

In the above-mentioned buck-boost switching regulator, preferably, a feedback voltage is compared with different reference voltages in the first loop and the second loop, or different feedback voltages are compared with the same reference voltage in the first loop and the second loop.

According to another aspect of the present invention, a control method for controlling a buck-boost switching regulator comprises the steps of:

providing a switching regulator including a first and a second switch electrically connected with each other, the first switch having an end electrically connected with an input voltage, and the second switch having an end electrically connected with ground; a third and a fourth switch electrically connected with each other, the third switch having an end electrically connected with ground, and the fourth switch having an end electrically connected with an output voltage; and an inductor electrically connected between a node between the first and the second switch, and a node between the third and the fourth switch; and controlling the first and the second switch by a first control circuit, and controlling the third and the fourth switch by a second control circuit.

Preferably, in the above-mentioned buck-boost switching regulator and control method, when the input voltage is higher than the output voltage, the third switch maintains OFF and the fourth switch maintains ON; when the input voltage is lower than the output voltage, the first switch maintains ON and the second switch maintains OFF.

For better understanding the objectives, characteristics, and effects of the present invention, the present invention will be described below in detail by illustrative embodiments with reference to the attached drawings.

DESCRIPTION OF THE PREFERRED EMBODIMENT

Figure 2:
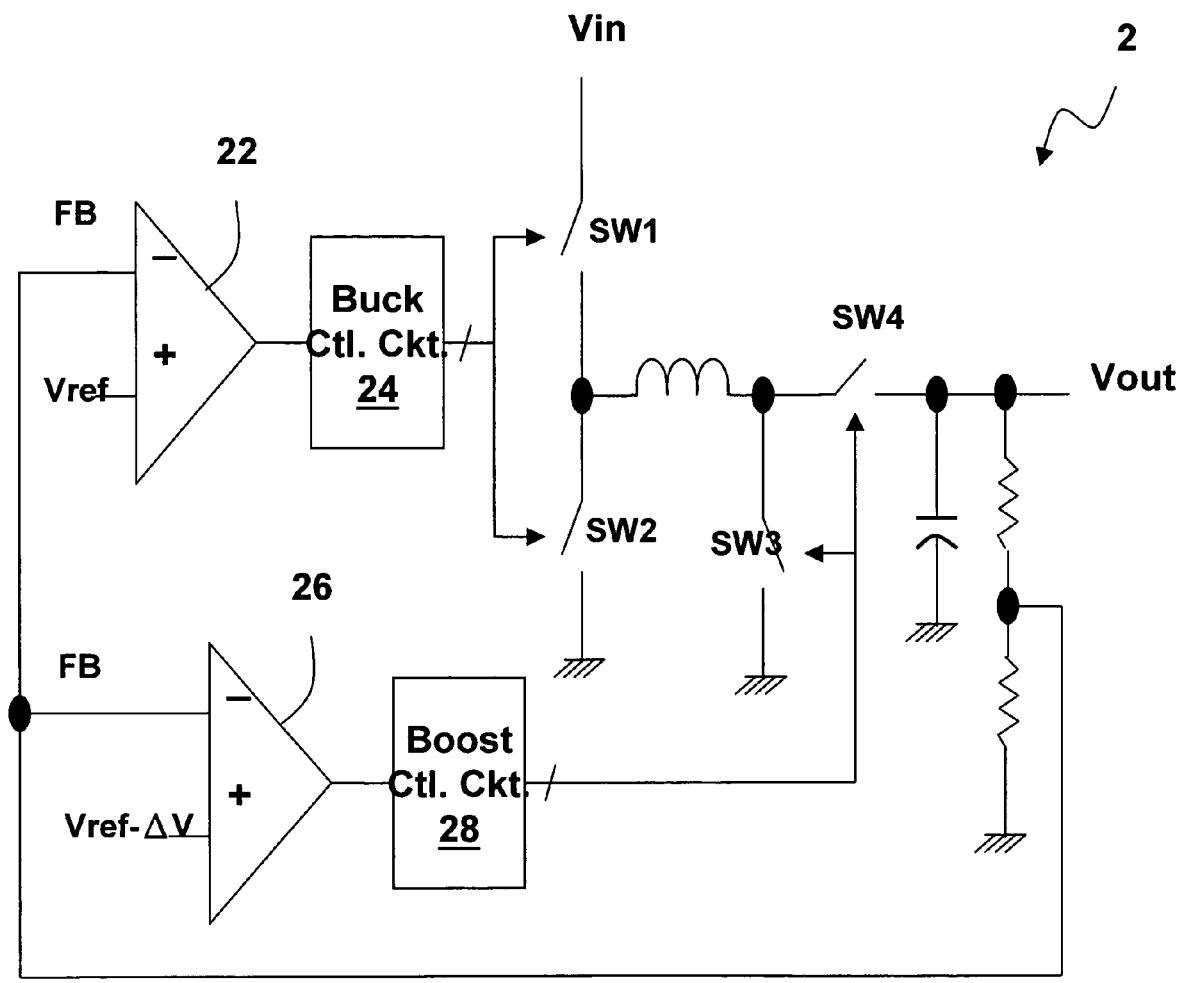
FIG. 2 is a circuit diagram schematically showing a buck-boost switching regulator according to one embodiment of the present invention.

FIG. 2 schematically shows a buck-boost switching regulator according to one embodiment of the present invention. As shown in the figure, in the buck-boost switching regulator 2 of the present invention, the buck mode switches SW1 and SW2 and the boost mode switches SW3 and SW4 are separately controlled.

More specifically, the circuit 2 controls the switches SW1 and SW2 through an error amplifier 22 and a buck control circuit (Buck Ctl. Ckt.) 24, and controls the switches SW3 and SW4 through an error amplifier 26 and a boost control circuit (Boost Ctl. Ckt.) 28. When the input voltage is relatively higher than the output voltage Vout and thus capable of supporting the buck mode operation, the switch SW3 maintains OFF and the switch SW4 maintains ON, and the switches SW1 and SW2 are switching under the control by the buck control circuit 24 so that the circuit balances at the state where FB=Vref.

When the input voltage drops as compared with the output voltage Vout such that it reaches a range where Vref−ΔV<FB<Vref, the switches SW1 and SW2 operate in 100% duty cycle, but the output voltage still drops until it reaches the state where FB=Vref−ΔV. At this point the circuit 2 enters the boost mode wherein the switches SW3 and SW4 are switching under the control by the boost control circuit 28, and the switch SW1 maintains ON and the switch SW2 maintains OFF, so that the circuit balances at the state where FB=Vref−ΔV.

The switches SW1-SW4 can be made of NMOS or PMOS transistors, for example.

Figure 1:
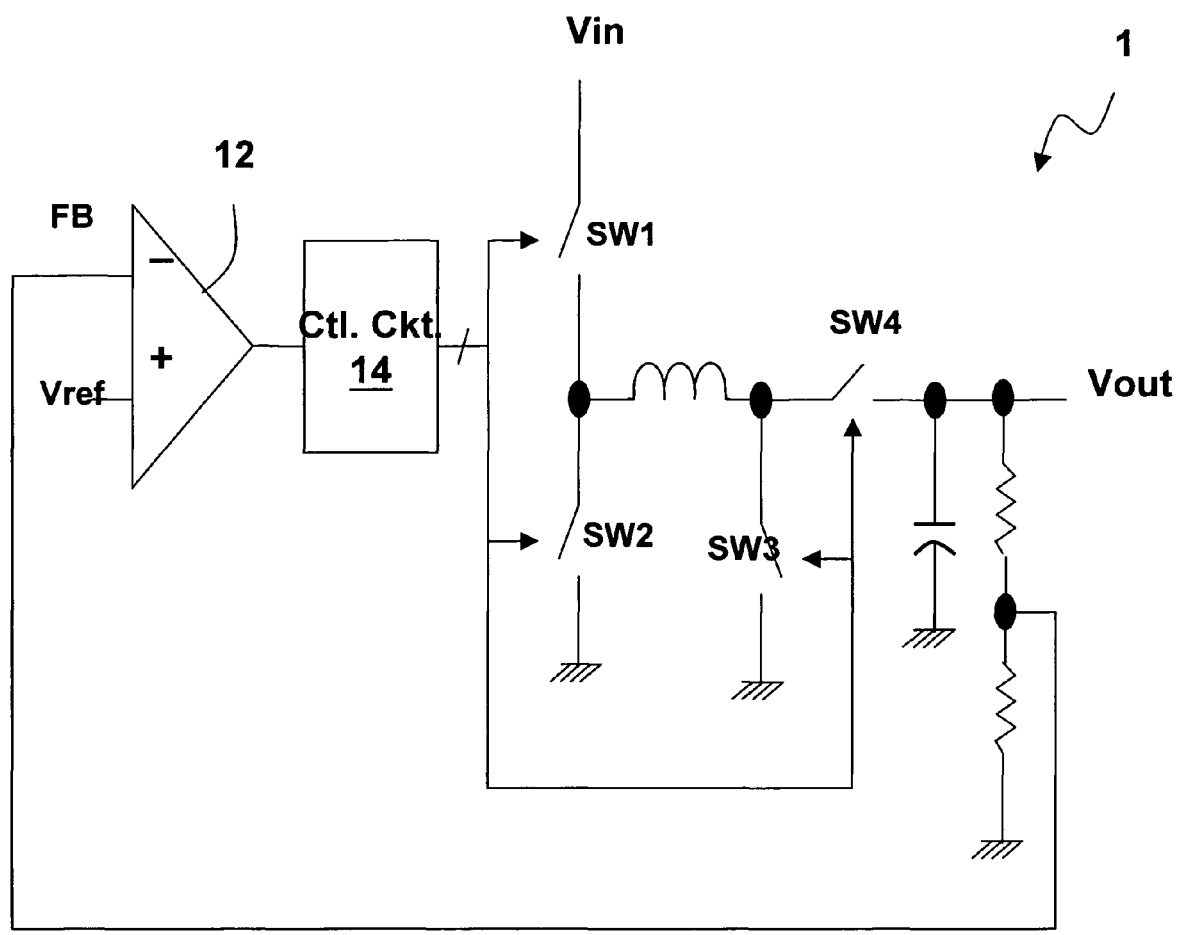
FIG. 1 is a circuit diagram schematically showing a conventional buck-boost switching regulator.

In comparison with the prior art of FIG. 1, the present invention includes the following merits:

(1) because the four switches are separately controlled in two loops, they will never operate in the same period; the switching loss is much smaller;

(2) because the control loops for the buck mode operation and the boost mode operation are different, the bandwidth of the buck mode operation is not limited by the bandwidth of the boost mode operation, and the transient response is better;

(3) because the circuit can operate in the buck mode all the way until 100% duty cycle, and then switches to the boost mode, it has better efficiency and smoother transition between the buck mode and the boost mode;

(4) the setting of the parameter ΔV is flexible, so the circuit can meet wide variety of requirements in product applications.

The features, characteristics and effects of the present invention have been described with reference to its preferred embodiment, which is provided only for illustrative purpose, and not for limiting the scope of the present invention. Various other substitutions and modifications will occur to one skilled in the art, without departing from the spirit of the present invention. For example, in the described embodiment, the feedback voltage signal FB is obtained by dividing the output voltage Vout. However, the feedback signal can be obtained by many ways other than such. As another example, to compare the same feedback voltage signal FB with different reference voltages Vref and Vref−ΔV, can be modified as comparing different feedback voltage signals FB and FB+ΔFB with the same reference voltages Vref. The voltage ΔV or ΔFB is not necessarily provided by a physical device, but instead can be embodied as an input offset voltage in the error amplifiers 22 or 26. Therefore, all such substitutions and modifications are intended to be embraced within the scope of the invention as defined in the appended claims.

What is claimed is:

1. A buck-boost switching regulator comprising:
   (1) a first loop including:
      a first and a second switch electrically connected with each other, the first switch having an end electrically connected with an input voltage, and the second switch having an end electrically connected with ground; and
      a first control circuit controlling the operation of the first and the second switch;
   (2) a second loop including:
      a third and a fourth switch electrically connected with each other, the third switch having an end electrically connected with ground, and the fourth switch having an end electrically connected with an output voltage; and
      a second control circuit controlling the operation of the third and the fourth switch; and
   (3) an inductor electrically connected between a node between the first and the second switch, and a node between the third and the fourth switch;
   wherein the first loop includes a first error amplifier which compares a first feedback voltage obtained from the output voltage with a first reference voltage;
   wherein the second loop includes a second error amplifier which compares the first feedback voltage obtained from the output voltage with a second reference voltage.

2. The buck-boost switching regulator of claim 1, wherein the second reference voltage is lower than the first reference voltage.

3. A method for controlling a buck-boost switching regulator, comprising the steps of:
   providing a switching regulator including
      a first and a second switch electrically connected with each other, the first switch having an end electrically connected with an input voltage, and the second switch having an end electrically connected with ground;
      a third and a fourth switch electrically connected with each other, the third switch having an end electrical connected with ground and the fourth switch having an end electrically connected with an output voltage; and
      an inductor electrically connected between a node between the first and the Second switch, and a node between the third and the fourth switch;
   controlling the first and the second switch by a first control circuit, and controlling the third and the fourth switch by a second control circuit;
   obtaining a first feedback voltage from the output voltage;
   comparing the first feedback a first reference voltage;
   controlling the first control circuit according to the comparison result between the first feedback voltage and the first reference voltage;
   comparing the first feedback voltage with a second reference voltage; and
   controlling the second control circuit according to the comparison result between the first feedback voltage and the second reference voltage.

4. The method of claim 3, wherein the second reference voltage is lower than the first reference voltage.

* * * * *